US010870570B2

(12) United States Patent
Takezawa et al.

(10) Patent No.: US 10,870,570 B2
(45) Date of Patent: *Dec. 22, 2020

(54) SAFETY JOINT

(71) Applicant: TATSUNO CORPORATION, Tokyo (JP)

(72) Inventors: Masahiro Takezawa, Tokyo (JP); Yuki Terasoma, Tokyo (JP); Kiyoshi Kimura, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/031,935

(22) Filed: Jul. 10, 2018

(65) Prior Publication Data

US 2019/0017640 A1    Jan. 17, 2019

(30) Foreign Application Priority Data

Jul. 11, 2017   (JP) ................................. 2017-135262

(51) Int. Cl.
*F16L 29/02* (2006.01)
*F16L 35/00* (2006.01)
(Continued)

(52) U.S. Cl.
CPC ............ *B67D 7/3218* (2013.01); *B67D 7/00* (2013.01); *F16L 29/02* (2013.01); *F16L 35/00* (2013.01);
(Continued)

(58) Field of Classification Search
CPC ..... B67D 7/00; B67D 7/3218; F16L 55/1015; F16L 55/1007; F16L 37/35; F16L 37/34;
(Continued)

(56) References Cited

U.S. PATENT DOCUMENTS 1,859,251 A * 5/1932 Brown ................... F16L 37/248
                                                        285/101
2,689,754 A * 9/1954 Dunton ................... F16L 25/00
                                                        285/18
(Continued)

FOREIGN PATENT DOCUMENTS

EP          3333469 A1    6/2018
JP       2007120717 A     5/2007
JP       2007120717 A  *  5/2007

OTHER PUBLICATIONS

Extended European Search Report for EP 18 18 2497; dated Dec. 31, 2018.

*Primary Examiner* — David Colon-Morales
(74) *Attorney, Agent, or Firm* — Stetina Brunda Garred and Brucker; Mark B. Garred

(57) ABSTRACT

To provide a safety joint capable of preventing moment generated by swinging of a filling hose and surely separating the safety joint to a hydrogen filling apparatus side member and a vehicle side member when a tensile force more or equal to a predetermined value is applied to the filling hose. The safety joint 100 according to the present invention includes a plug (10: vehicle side member) with a cylindrical shape in which a passage (1A: in-plug passage) is formed, a socket (20) in which a passage (21A: in-socket passage) continuing to the passage (1A) in the plug (10) is formed, and a shut off valve mounted on the passage (21A: in-socket passage) in the socket (20), the shut off valve opening when the plug (10) being inserted into the socket (20) and closing when the plug (10) being disconnected therefrom, wherein central axes of the passages of the plug and the socket do not form a straight line (but those are orthogonal with each other for instance), a filling hose (61) is connected to the plug (10), and a hose guide (70, 70A) for limiting movement of the filling hose (61) at a position separated from the plug (10).

10 Claims, 11 Drawing Sheets

(51) Int. Cl.
    *F16L 55/10*     (2006.01)
    *B67D 7/32*     (2010.01)
    *B67D 7/00*     (2010.01)
    *F16L 37/34*     (2006.01)
    *F16L 37/35*     (2006.01)

(52) U.S. Cl.
    CPC ........... *F16L 55/1015* (2013.01); *F16L 37/34* (2013.01); *F16L 37/35* (2013.01)

(58) Field of Classification Search
    CPC . F16L 37/32; F16L 37/23; F16L 29/02; F16L 35/00
    See application file for complete search history.

(56) References Cited

U.S. PATENT DOCUMENTS

| | | | | |
|---|---|---|---|---|
| 2,694,601 A * | 11/1954 | Higginbotham | B67D 7/40 | 222/333 |
| 3,160,333 A * | 12/1964 | Budrow | F16L 3/01 | 222/530 |
| 4,351,351 A * | 9/1982 | Flory | F16L 55/1015 | 137/614.03 |
| 4,617,975 A * | 10/1986 | Rabushka | F16L 37/23 | 137/234.6 |
| 4,854,338 A * | 8/1989 | Grantham | F16L 55/1007 | 137/68.14 |
| 4,864,696 A * | 9/1989 | Mittermaier | B67D 7/32 | 24/285 |
| 4,921,281 A * | 5/1990 | Taylor | F16L 55/1108 | 285/90 |
| 4,998,560 A * | 3/1991 | Le Devehat | B67D 7/3218 | 137/615 |
| 5,222,520 A * | 6/1993 | Anderson | F16L 35/00 | 137/327 |
| 5,285,807 A * | 2/1994 | Nitzberg | F16L 55/1007 | 137/68.14 |
| 5,564,471 A * | 10/1996 | Wilder | F16L 55/1015 | 137/614.04 |
| 5,570,719 A * | 11/1996 | Richards | F16L 37/148 | 137/614.04 |
| 5,727,765 A * | 3/1998 | Alvern | B67D 7/32 | 222/529 |
| 7,021,345 B2 * | 4/2006 | Webb | B67D 7/3218 | 137/614.04 |
| 7,575,023 B2 * | 8/2009 | Fraser | F16K 17/40 | 137/614.04 |
| 8,251,084 B2 * | 8/2012 | Brown | F16L 27/0841 | 137/614.04 |
| 8,578,957 B2 * | 11/2013 | Wolff | F16L 55/1007 | 137/614.04 |
| 9,322,498 B2 * | 4/2016 | Wolff | F16L 37/004 | |
| 9,377,145 B2 * | 6/2016 | Cruickshank | F16L 37/248 | |
| 9,528,648 B2 * | 12/2016 | Nanaji | F16L 37/113 | |
| 9,791,087 B2 * | 10/2017 | Boothe | F16L 55/1015 | |
| 10,274,118 B2 * | 4/2019 | Takezawa | F16L 27/06 | |
| 10,336,604 B2 * | 7/2019 | Clever | B67D 7/3218 | |
| 10,407,297 B2 * | 9/2019 | Karino | B67D 7/3218 | |
| 2010/0319690 A1 * | 12/2010 | Cuzydlo | A61M 16/183 | 128/203.12 |
| 2010/0319794 A1 * | 12/2010 | Ward | F16K 24/04 | 137/596 |
| 2013/0333767 A1 * | 12/2013 | Schmidt | F16L 37/35 | 137/15.18 |
| 2018/0163928 A1 * | 6/2018 | Takezawa | F17C 13/12 | |
| 2019/0017616 A1 * | 1/2019 | Takezawa | B67D 7/3218 | |
| 2019/0017642 A1 * | 1/2019 | Takezawa | B67D 7/54 | |

* cited by examiner

[Fig. 1]
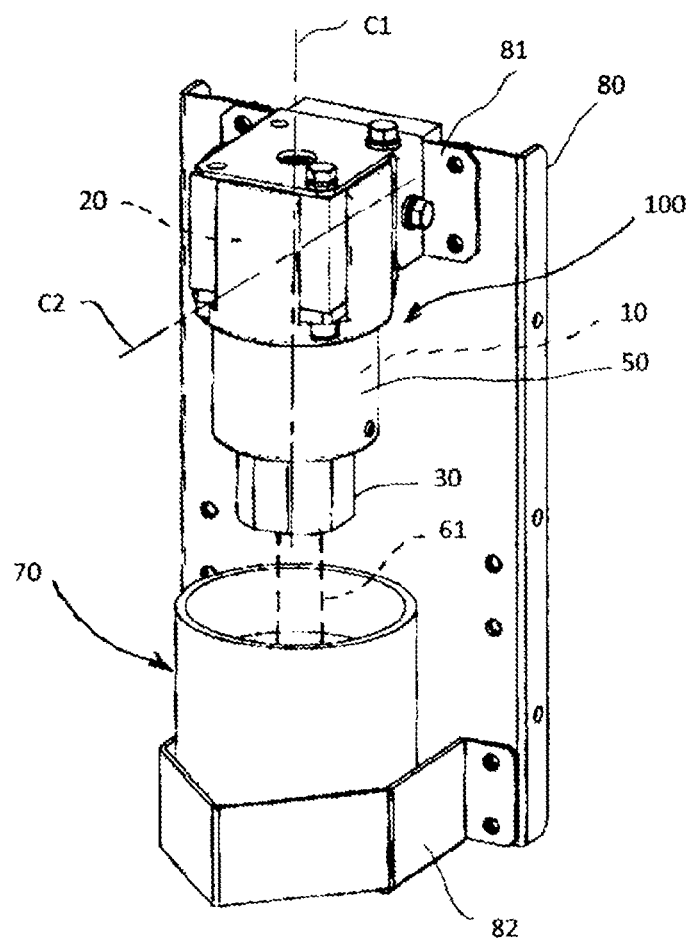

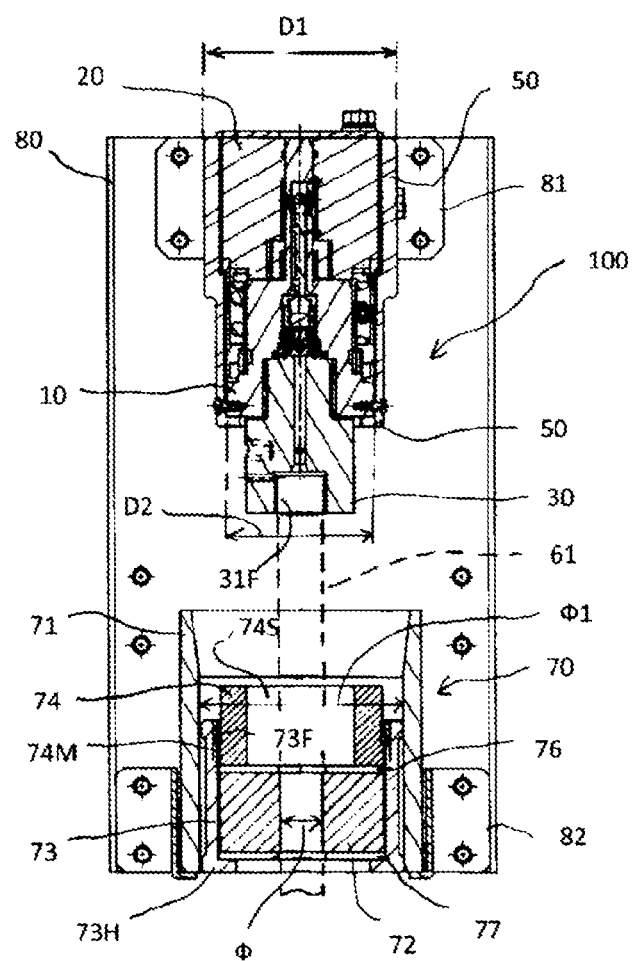
[Fig. 2]

[Fig. 3]
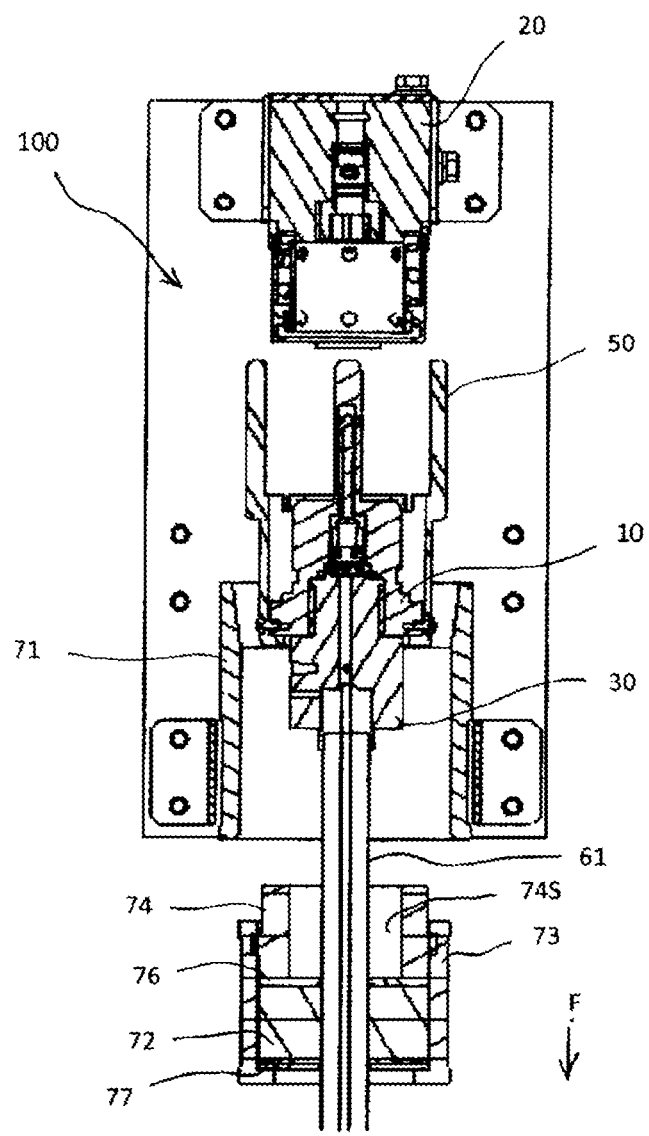

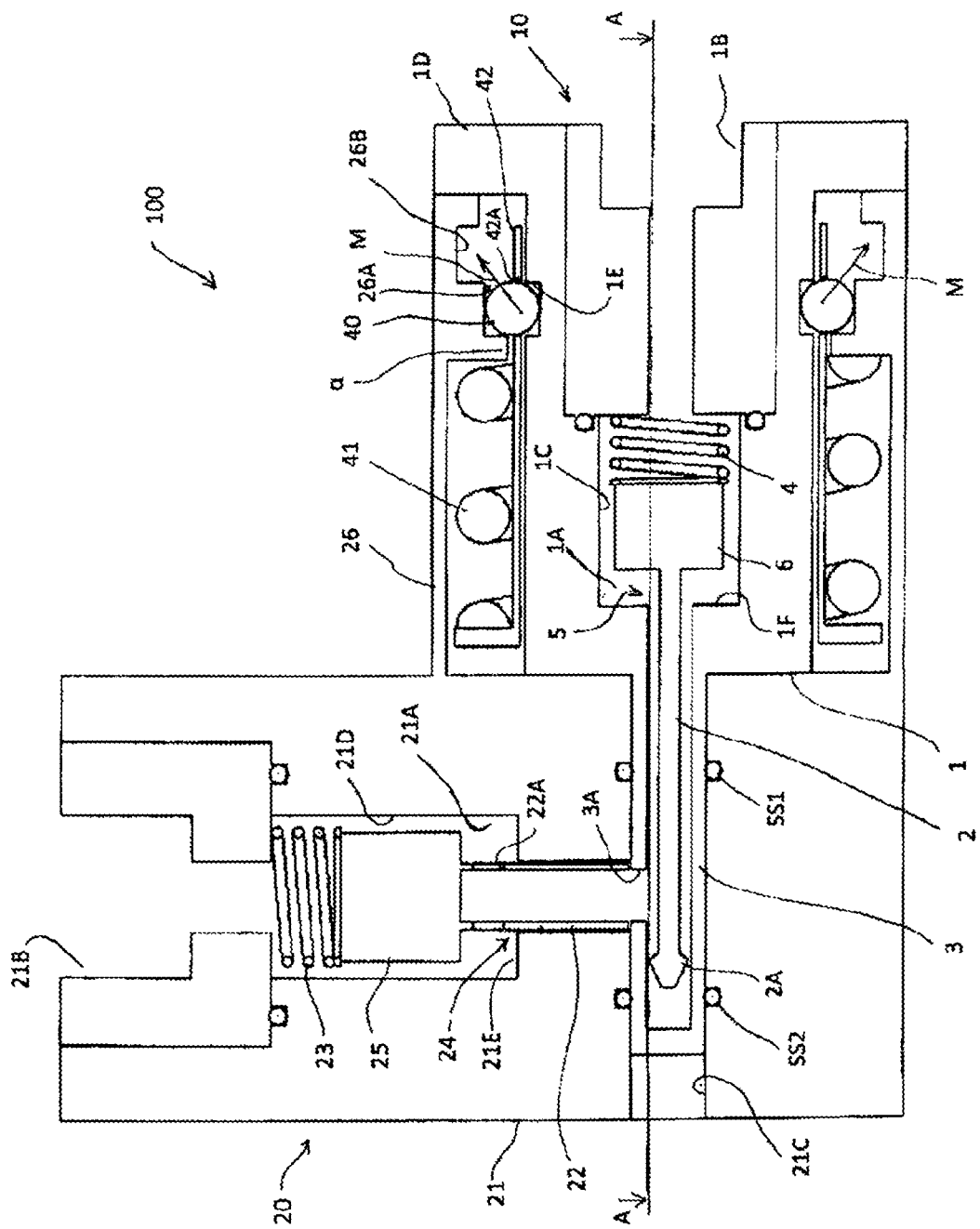
[Fig. 4]

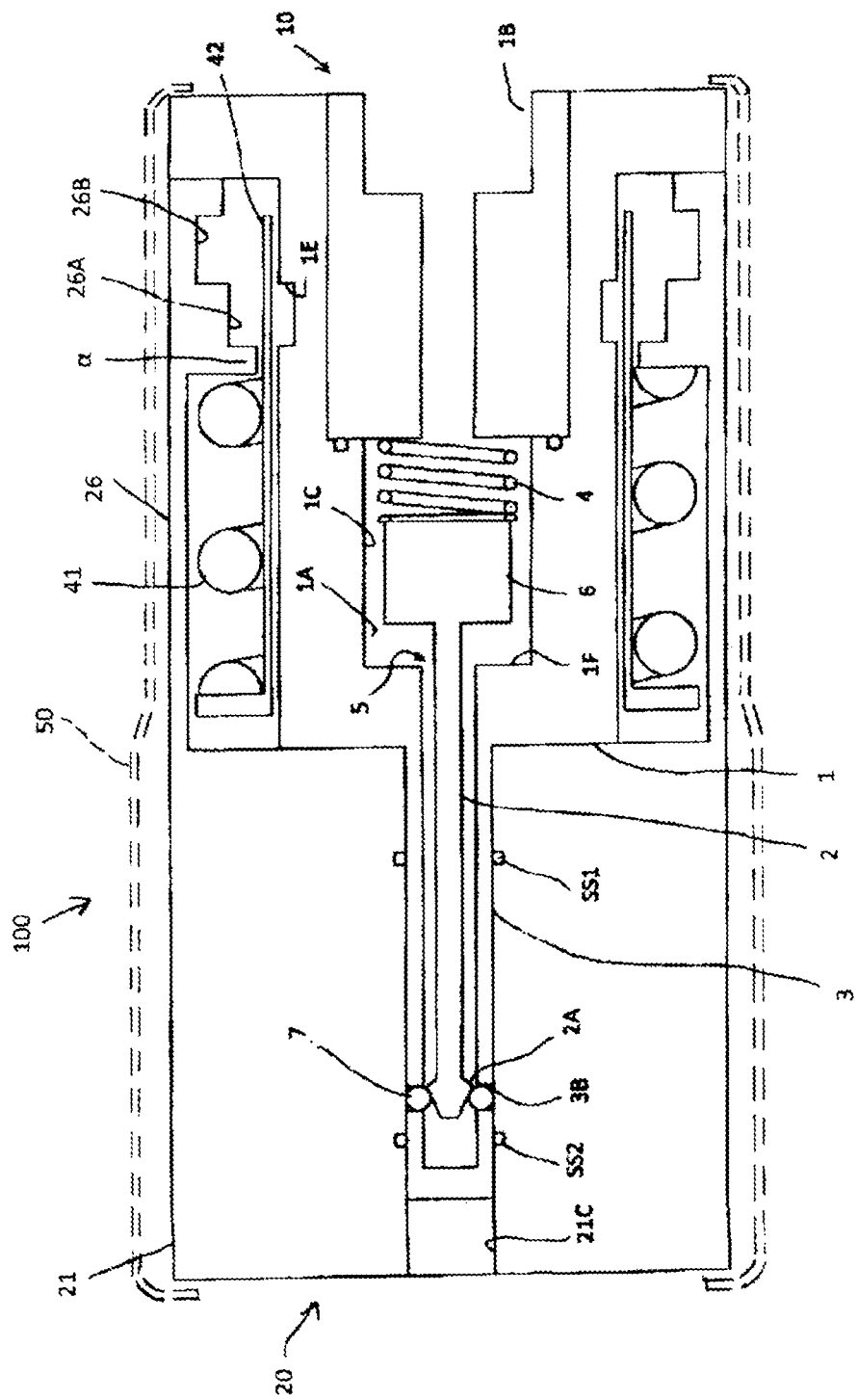
[Fig. 5]

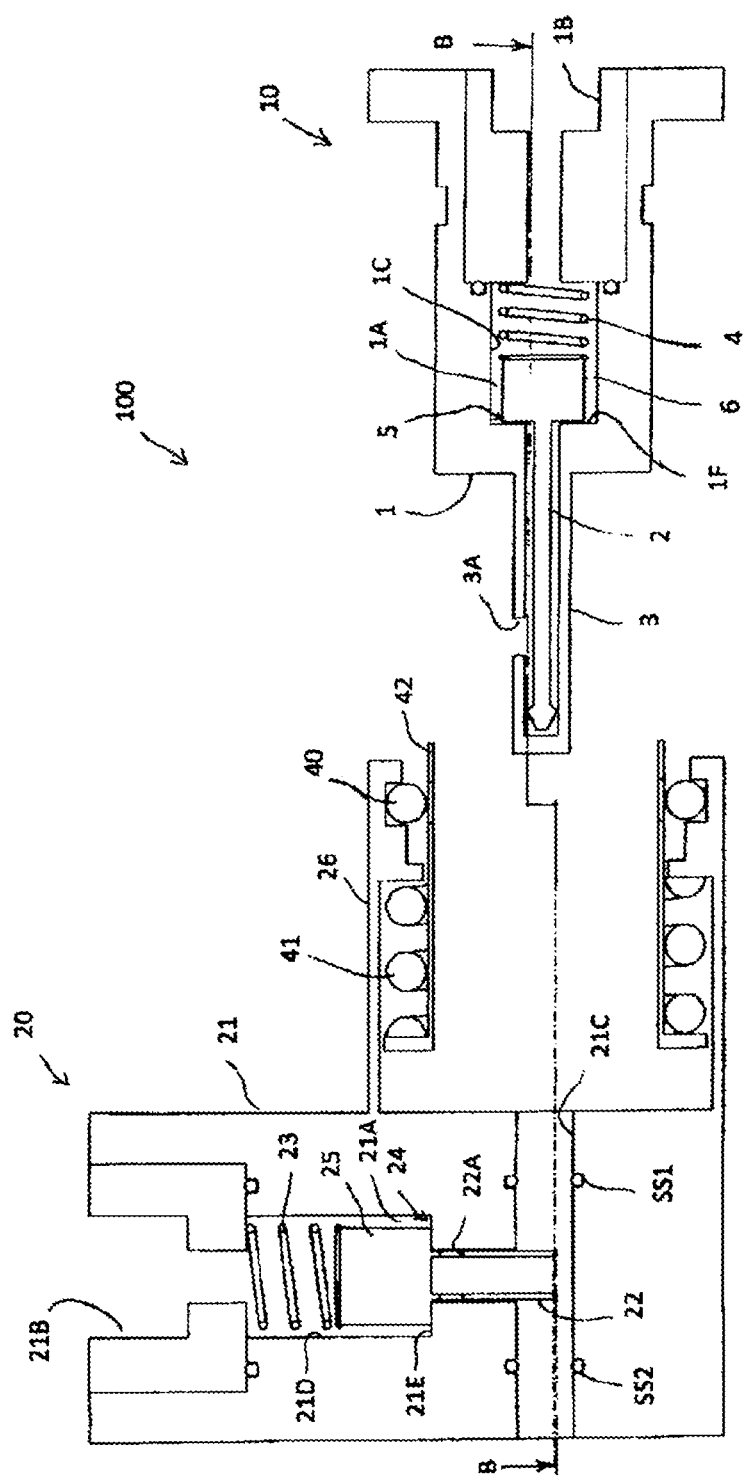
[Fig. 6]

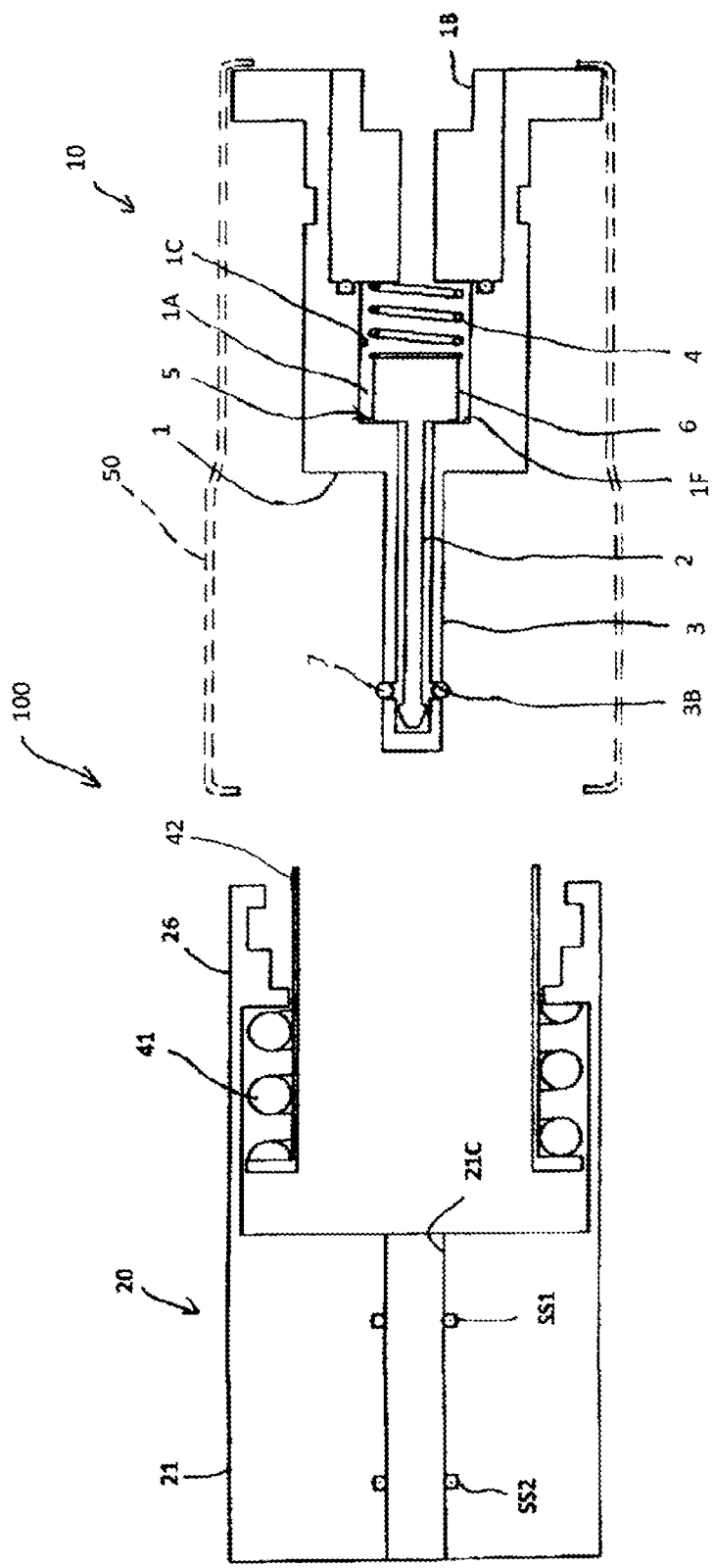
[Fig. 7]

[Fig. 8]
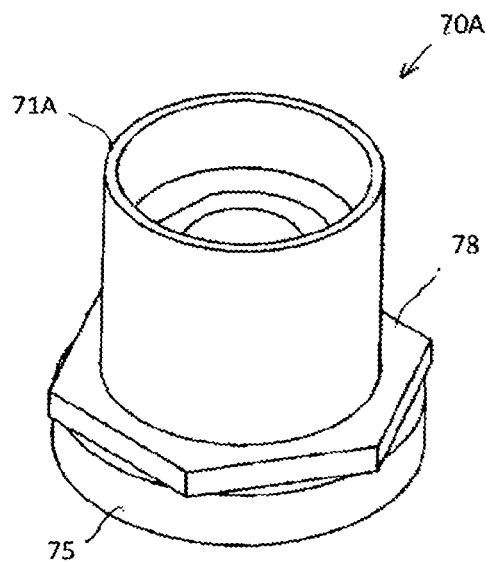
[Fig. 9]
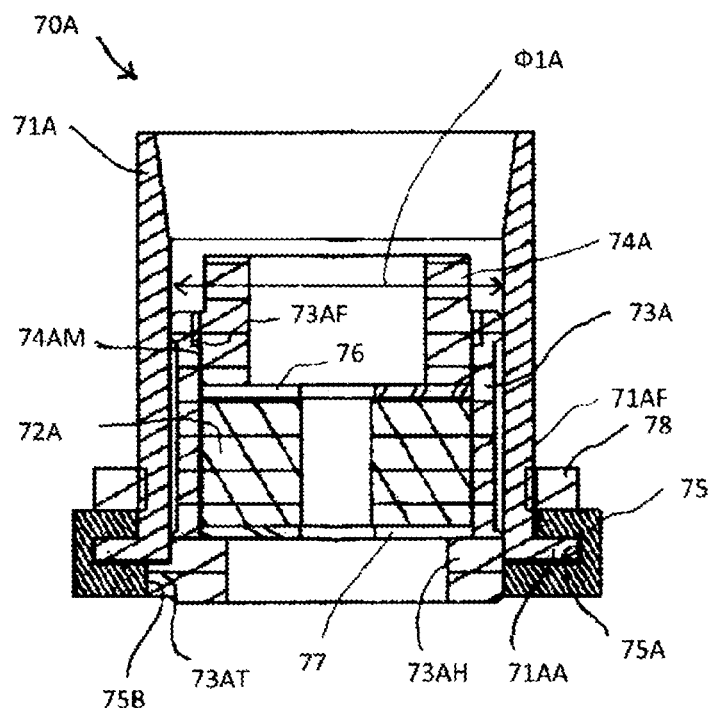

[Fig. 10]
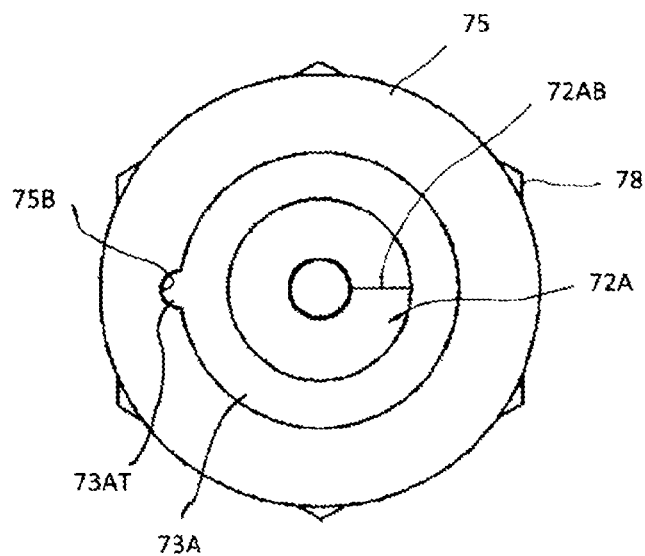
[Fig. 11]
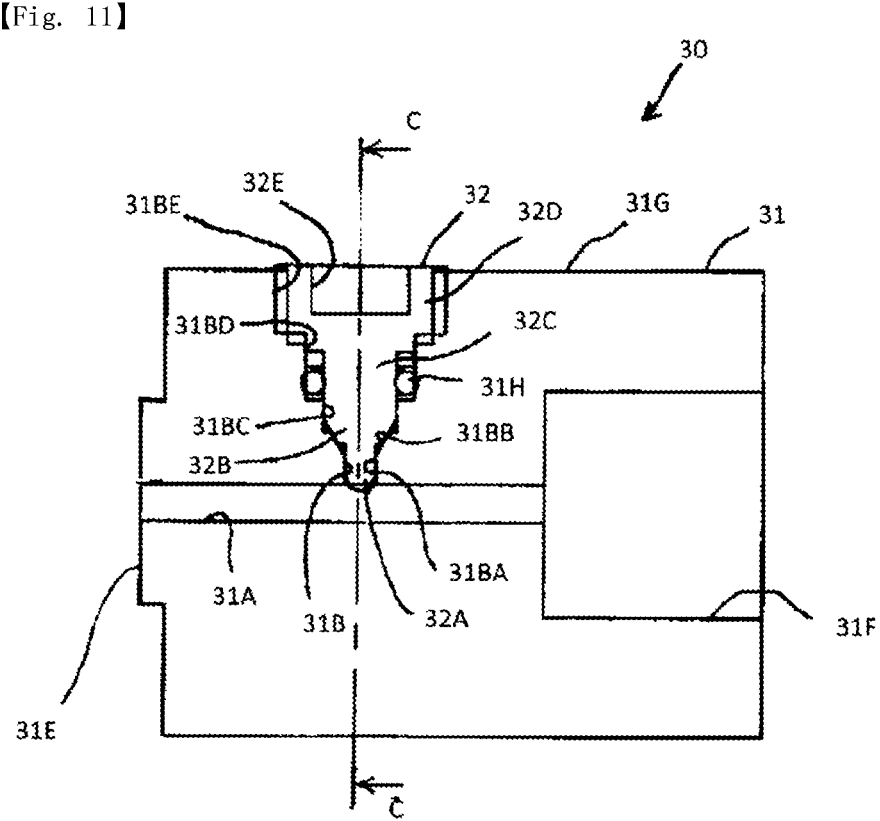

[Fig. 12]
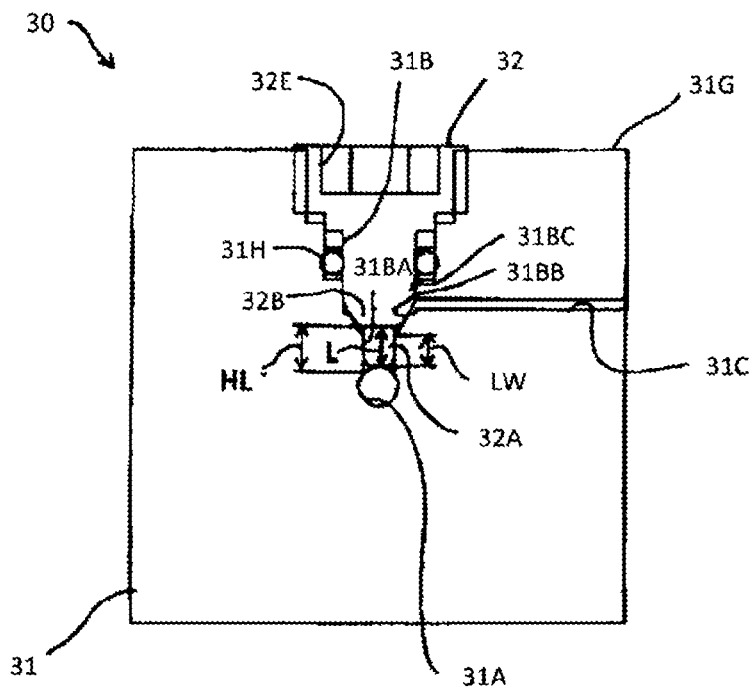
[Fig. 13]
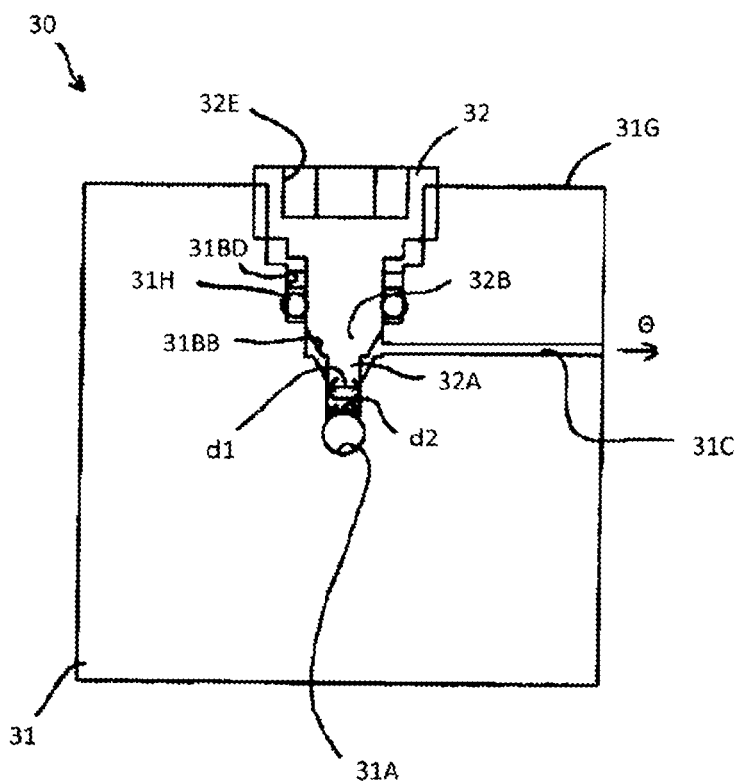

[Fig. 14]
(PRIOR ART)
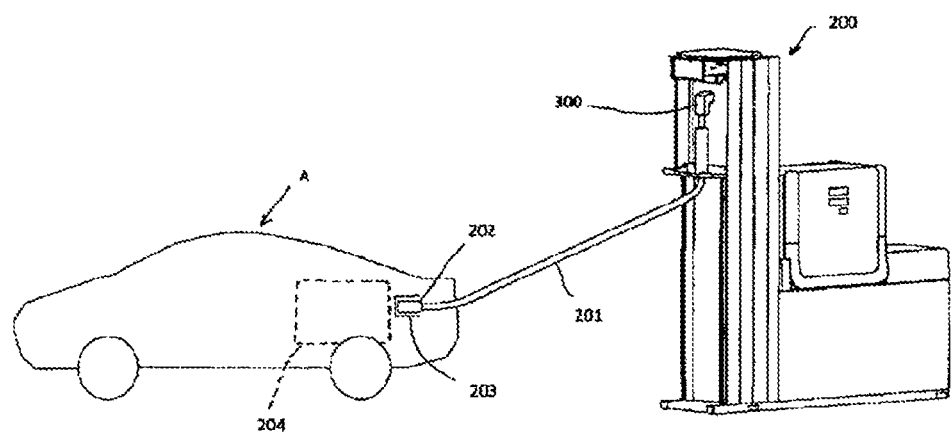

SAFETY JOINT

CROSS-REFERENCE TO RELATED APPLICATIONS

The present application claims priority to Japanese Patent Application No. 2017-135262 filed on Jul. 11, 2017, the disclosure of which are incorporated herein by reference.

STATEMENT RE: FEDERALLY SPONSORED RESEARCH/DEVELOPMENT

Not Applicable

BACKGROUND

1. Field of the Invention

The present invention relates to a safety joint for a filling apparatus for filling gas such as hydrogen gas used as fuel, more particularly to a safety joint for separating the filling apparatus and a filling hose from each other in an emergency.

2. Description of the Related Art

For example, to a vehicle A using hydrogen as fuel, as show in FIG. 14, at a hydrogen filling station is filled hydrogen gas after a filling nozzle 202 mounted on an end of a filling hose 201 and a vehicle side filling port 203 are connected with each other. The filling is controlled depending on the maximum using pressure of a hydrogen tank 204 mounted in the vehicle A. Here, when the vehicle A runs to pull the filling hose 201 while hydrogen gas is filled, a hydrogen filling apparatus is broken to inject a hydrogen gas, so that it becomes a dangerous condition. Then, a safety joint 300 for emergency releasing is mounted between a hydrogen filling apparatus 200 and the filling hose 201, and when to the filling hose 201 is applied a tensile force more or equal to a predetermined value, the safety joint 300 separates to prevent the hydrogen filling apparatus 200 from being broken.

However, in case that the tensile force more or equal to the predetermined value is not applied to the filling hose 201, when the filling hose 201 swings, there is a possibility that moment generated by the swinging of the filling hose 201 acts on a filling hose attached portion of a vehicle side member (plug) of the safety joint 300, and the attached portion is broken to leak a hydrogen gas through the broken portion. Conventionally, any measures are not taken to prevent that the moment generated by the swinging of the filling hose 201 breaks a plug of the safety joint 300.

As other conventional techniques are proposed safety joints for emergency releasing whose passages of the plug and the socket are orthogonal with each other (refer to Japanese patent publication No. 2007-120717 gazette for example), but a safety joint capable of preventing the safety joint from being broken due to the moment generated by the swinging of the filling hose 201 has not been proposed yet.

The contents of Japanese Patent Publication No. 2007-120717 is incorporated herein by reference in their entirety.

BRIEF SUMMARY

The present invention has been made in consideration of the above problems in the prior art, and the object thereof is to provide a safety joint capable of preventing the safety joint from being broken due to the moment generated by the swinging of the filling hose and surely separating a hydrogen filling apparatus side member from the vehicle side member when the tensile force more or equal to the predetermined value is applied to the filling hose to prevent the hydrogen filling apparatus from being broken.

A safety joint 100 according to the present invention is characterized by including a plug (10: vehicle side member) with a cylindrical shape in which a passage (1A: in-plug passage) is formed, a socket (20) in which a passage (21A: in-socket passage) continuing to the passage (1A) in the plug (10) is formed, and a shut off valve mounted on the passage (21A: in-socket passage) in the socket (20), the shut off valve opening when the plug (10) being inserted into the socket (20) and closing when the plug (10) being disconnected therefrom, wherein central axes of the passages of the plug (10) and the socket (20) do not form a straight line (but those are orthogonal with each other for instance), a filling hose (61) is connected to the plug (10), and hose guides (70, 70A) for limiting movement of the filling hose (61) at a position separated from the plug (10). It is preferable that the safety joint (100) according to the present invention is arranged near a base portion of the filling hose (61) communicating with a filling nozzle and near a weighing machine (hydrogen filling apparatus).

In the present invention, it is preferable that the hose guides (70, 70A) include outer cylinders (71, 71A), elastic members (72, 72A) for surrounding the filling hose (61), elastic member accommodating portions (73, 73A) accommodating the elastic members (72, 72A) in a hollow portion, and lid portions (74, 74A) engaging with the elastic member accommodating portions (73, 73A) to close the hollow portion, and inner diameter sizes ($\varphi 1$, $\varphi 1A$) of the outer cylinders (71, 71A) are larger than the maximum diameter (D2) of the plug (10). It is preferable that the outer cylinder (70A) is fixed by an outer cylinder fixing portion (75), a projection (73AT) projecting outward in a radial direction of the hose guide (70A) is formed on an end portion (a lower end portion in FIG. 9) of the elastic member accommodating portion (73A) of the hose guide (70A), and a channel (75B) capable of accommodating the projection (73AT) is formed on an inner peripheral surface of the outer cylinder fixing portion (75).

In the present invention, it is preferable that the safety joint further includes a cover (50) for protecting a valve rod mounted on one of the plug (10) and the socket (20). Then, it is preferable that a longitudinal size of the cover (50) is longer than that of the valve rod (plug side rod 2, for example) and the cover (50) completely covers the valve rod. In this case, it is preferable that inner diameter sizes ($\varphi 1$, $\varphi 1A$) of the outer cylinders (71, 71A) of the hose guides (70, 70A) are larger than the maximum diameter (D1) of the cover (50).

In the present invention, it is preferable that the cover (50) is configured to surround one portion of a member on a side that the valve rod (2) is not mounted and capable of being attached to the plug (10) and the socket (20). Here, "capable of being attached" defines that, in an emergency such that a vehicle suddenly moves when hydrogen is filled, the cover (50) does not prevent the separation between the plug (10) and the socket (20) but the cover (50) is not separated from the member on which the valve rod (2) is mounted (plug 10, for example) even when the plug (10) and the socket (20) are separated from each other.

In addition, in the present invention, it is preferable that the plug (10) includes a depressurizer (30) including a main body portion (31) made of metal, a depressurizing communication hole (31B) communicating with a hydrogen gas passage (31A) in the main body portion (31), a depressurizing plug (32) made of metal, the depressurizing plug (32) capable of being inserted into the depressurizing communication hole (31B), and tapered portions (a pin tapered portion 32B of the depressurizing plug 32 and a tapered portion 31BB of the depressurizing communication hole 31B) formed on the depressurizing communication hole (31B) and the depressurizing plug (32) respectively, the tapered portions having complemental shapes with each other. In this case, it is preferable that a relief circuit (31C) for discharging filled fluid (hydrogen gas, for example) is formed, the relief circuit (31C) communicates with the depressurizing communication hole (31B), and an outlet of the relief circuit (31C) is formed at a position separated from an upper region of the depressurizing plug (32).

In the depressurizer (30), it is preferable that length (L) of a hydrogen passage side end portion (32A: pin end portion) of the depressurizing plug (32) and a length (HL) of a hydrogen passage side end portion (31BA: small diameter portion) of the depressurizing communication hole (31B) are long.

With the present invention with the above construction, the filling hose (61) is held by the small diameter portions (portions with inner diameter φ) of the hose guides (70, 70A) and the plug (10) side end portion of the safety joint (100). A swinging of the hose (61) is perfectly shut at a portion held by the small diameter portions (portions with inner diameter φ) of the hose guides (70, 70A) and is not transmitted to the plug (10) side of the safety joint (100). Therefore, moment generated by the swinging of the hose (61) do not act on the plug (10) of the safety joint (100), and it is prevented that the plug (10) is broken.

In addition, in the safety joint (100) according to the present invention, when the inner diameters (φ1, φ1A) of the outer cylinders (71, 71A) of the hose guides (70, 70A) are larger than an outer diameter (D2: maximum diameter) of the plug (10) of the safety joint (100), even if a tensile force more or equal to a predetermined value is applied to the filling hose (61) due to a sudden movement of the vehicle during hydrogen filling for instance to separate the socket (20) and the plug (10) from each other, the separated plug (10) passes through the insides of the outer cylinders (71, 71A) of the hose guides (70, 70A). Therefore, a tensile force applied to the filling hose (61) does not act on the hydrogen filling apparatus, it is prevented that the hydrogen filling apparatus is fallen and breakage thereof due to the fall.

In the present invention, with the hose guides (70, 70A) including the outer cylinders (71, 71A) whose inner diameter sizes (φ1, φ1A) are larger than the maximum diameter (D2) of the plug (10), the elastic members (72, 72A) for surrounding the filling hose (61), the elastic member accommodating portions (73, 73A) for accommodating the elastic members (72, 72A) in the hollow portion, and the lid portions (74, 74A) engaging with the elastic member accommodating portions (73, 73A) to close the hollow portion, when a tensile force more or equal to the predetermined value is applied to the filling hose (61) to separate the socket (20) and the plug (10) from each other, not only the filling hose (61) and the plug (10) but also the elastic member accommodating portions (73, 73A), the lid portions (74, 74A), the elastic members (72, 72A) of the hose guides (70, 70A) can pass through areas inside the outer cylinders (71,71A) in a radial direction of the hose guides (70, 70A). Then, the plug (10) surely moves on the vehicle side from the hose guides (70, 70A), the tensile force toward the vehicle is not applied to the socket (20) and the hydrogen filling apparatus, and it is surely prevented that the hydrogen filling apparatus is fallen or broken.

Here, when the outer cylinder (71A) is fixed by the outer cylinder fixing portion (75), on the end portion (lower end portion in FIG. 9) of the elastic member accommodating portion (73A) of the hose guide (70A) is formed the projection (73AT) projecting outward in a radial direction of the hose guide (70A), and on the inner peripheral surface of the outer cylinder fixing portion (75) is formed the channel (75B) capable of accommodating the projection (73AT), the projection (73AT) fits into the channel (75B), which prevents the outer cylinder fixing portion (75) and the elastic member accommodating portion (73A) from rotating relative to each other. Then, even if a twist occurs on the filling hose (61), at the portion where the filling hose (61) is held by the elastic member (72A) is suppressed rotation of the filling hose (61), so that it is prevented that the rotating force due to the twist acts on the plug (10) to break it.

In the present invention, with the cover (50) for surrounding the valve rod (plug side rod 2, for example), even if the plug (10) and the socket (20) of the safety joint (100) are separated from each other in an emergency, and the member (plug 10, for example) on the valve rod (2) side falls or collides with the hydrogen filling apparatus, vehicle and the like, the valve rod (2) is protected by the cover (50), so that any impact due to the falling and the collision of the valve rod (2) side member are not added to the valve rod (2), which prevents the valve rod (2) from being broken.

In addition, in the present invention, with the depressurizer (30) mounted on the plug (10), when the plug (10) and the socket (20) are separated from each other, high pressure hydrogen gas in the filling hose (61) can be discharged at small flow rate outside the filling hose (61) (outside the depressurizer 30). Therefore, it is prevented that the high pressure hydrogen gas rapidly injects, and the filling hose (61) unexpectedly moves around due to the rapid injection of the hydrogen gas.

BRIEF DESCRIPTION OF THE DRAWINGS

FIG. 1 is a perspective view showing a safety joint with a hose guide according to an embodiment of the present invention;

FIG. 2 is a cross sectional view showing the safety joint with the hose guide in the embodiment;

FIG. 3 is an explanatory disconnection view showing a condition that a plug and a socket of the safety joint are separated from each other and the plug is pulled together with a filling hose and inner members of the hose guide;

FIG. 4 is an explanatory cross sectional view showing a condition that the plug and the socket are connected with each other in the first embodiment;

FIG. 5 is a cross sectional view taken along the A-A line in FIG. 4;

FIG. 6 is an explanatory cross sectional view showing a condition that the plug and the socket are separated from each other in the first embodiment;

FIG. 7 is a cross sectional view taken along the B-B line in FIG. 6;

FIG. 8 is a perspective view showing a hose guide different from the hose guide shown in FIGS. 1 and 2;

FIG. 9 is a cross sectional view showing the hose guide shown in FIG. 8;

FIG. 10 is a bottom view showing the hose guide shown in FIGS. 8 and 9;

FIG. 11 is a cross sectional view showing a depressurizer in the embodiment;

FIG. 12 is a cross sectional view taken along the C-C line in FIG. 11;

FIG. 13 is a cross sectional view showing a condition that a risen depressurizing plug allows hydrogen gas to outflow from a relief circuit; and FIG. 14 is a brock diagram showing an outline of a hydrogen filling station.

DETAILED DESCRIPTION

Hereinafter, embodiments of the present invention will be explained with reference to the attached drawings. In FIGS. 1 and 2, a whole safety joint (pipe joint for emergency releasing) according to the embodiment is shown as the numeral 100. The safety joint 100 includes a plug 10 with a cylindrical shape and a socket 20. When the plug 10 and the socket 20 are connected with each other, shutoff valves in the plug 10 and the socket 20 open to communicate an in-plug passage 1A (FIG. 4) with an in-socket passage 21A (FIG. 4). In FIGS. 1 and 2, the plug 10 and the socket 20 are connected with each other, but when the plug 10 is separated from the socket 20, the shutoff valves therein close. The plug 10 is basically connected to a vehicle side (lower side in FIGS. 1 and 2), the socket 20 is basically communicated with a hydrogen filling apparatus (or a dispenser, a weighing machine) side, and the socket 20 extends from the front of the paper surface to the back thereof in FIGS. 1 and 2. However, it is possible to arrange the plug 10 to the hydrogen filling apparatus side and arrange the socket 20 to the vehicle side. In FIGS. 1 and 2, the socket 20 is mounted through an attachment member 81 and a base member 80 to the hydrogen filling apparatus not shown.

For example, as shown in FIG. 4, central axes of the passage in the plug 10 (in-plug passage 1A) and the passage in the socket 20 (in-socket passage 21A) are orthogonal with each other. Constructions and action effects of the plug 10 and the socket 20 will be explained in detail with reference to FIGS. 4 to 7. In addition, in FIG. 1, to the central axes of the in-plug passage and the in-socket passage are attached C1 and C2 respectively.

In FIGS. 1 and 2, a cover 50 is mounted to protect a plug side rod 2 (valve rod: refer to FIG. 4) mounted on the plug 10. The longitudinal size of the cover 50 is longer than that of the plug side rod 2, and the cover 50 extends along the central axis C1 of the in-plug passage and thoroughly surrounds the plug side rod 2 in the plug 10. In addition, the cover 50 surrounds a connected portion of the plug 10 and the socket 20. The cover 50 is mounted to protect the plug side rod 2 when the plug 10 and the socket 20 are separated from each other, so that the cover 50 is attached to the plug 10 side. However, the cover cannot prevent the separation between the plug 10 and the socket 20. In addition, the cover 50 can be omitted.

In FIGS. 1 and 2, on a vehicle side end portion (lower end portion in FIGS. 1 and 2) of the plug 10 surrounded by the cover 50 is mounted a depressurizer 30. The depressurizer 30 is not surrounded by the cover 50, and is connected to the plug 10 side. As shown in FIG. 2, to the depressurizer 30 is connected a vehicle side filling hose 61 thorough a concaved portion 31F. In addition, in FIGS. 1 and 2, the filling hose 61 is expressed with a virtual line. Construction and function of the depressurizer 30 will be explained in detail with reference to FIGS. 11 to 13. However, the depressurizer 30 can be omitted, in such a case, the vehicle side filling hose 61 is directly connect to the plug 10.

On the vehicle side of the plug 10 is connected the filling hose 61 through the depressurizer 30, and on an end portion of the filling hose 61 opposite to the plug 10 side is arranged a filling nozzle not shown. As described above, the socket 20 is connected to the hydrogen filling apparatus side, and the safety joint 100 is arranged near the hydrogen filling apparatus and a base portion of the filling hose 61.

In a direction that the filling hose 61 extends (lower side in FIGS. 1 and 2), at a position separated from the plug 10 is arranged a hose guide 70 for limiting movement (swinging) of the filling hose 61. In FIG. 2, the hose guide 70 is provided with an outer cylinder 71, an elastic member 72 for surrounding the filling hose 61, an elastic member accommodating portion 73 for accommodating the elastic member 72 in a hollow portion, and a lid portion 74 for closing the hollow portion of the elastic member accommodating portion 73. The outer cylinder 71 with a cylindrical shape accommodates the elastic member 72, the elastic member accommodating portion 73, and the lid portion 74 (members constructing the hose guide 70), and the outer cylinder 71 is attached through an attachment member 82 to the base member 80. Here, the inner diameter size $\varphi 1$ of the outer cylinder 71 is slightly larger than the maximum diameter D1 of the cover 50 for surrounding the plug 10. In addition, when the cover 50 is omitted, it is sufficient to set the inner diameter size $\varphi 1$ slightly larger than the maximum diameter D2 (D2<D1) of the plug 10.

In FIG. 2, the elastic member 72 with a columnar shape has a hole (small diameter portion) whose inner diameter is $\varphi$ on a central portion in a radial direction, into the hole is inserted the filling hose 61, and as a material of the elastic member 72 is selected an elastic member such as rubber. The inner diameter $\varphi$ of the small diameter portion (when the elastic member 72 is accommodated in the accommodating portion 73) is set slightly larger than the outer diameter of the filling hose 61, so that the elastic member 72 surrounds the filling hose 61 while tightening it to support it. Although not clearly shown in figures, in a radial direction of the elastic member 72 is formed a cut surface (corresponding to numeral 72AB in FIG. 10), and opening the elastic member 72 through the cut surface allows the elastic member 72 to be arranged to surround (wind around) the filling hose 61.

In FIG. 2, the elastic member accommodating portion 73 with a cylindrical shape is provided with a hollow portion for accommodating the elastic member 72, and a supporting portion 73H for supporting the elastic member 72 in a vertically direction in FIG. 2. A safety joint side (upper side in FIG. 2) end portion of the inner peripheral surface of the elastic member accommodating portion 73 projects radially inward, on an inner periphery in a radial direction of the projecting portion is formed a female screw 73F, and the female screw 73F engages with a male screw 74M of an outer peripheral surface of the lid portion 74. Then, the maximum outer diameter of the elastic member accommodating portion 73 is set smaller than the inner diameter size y 1 of the outer cylinder 71. The lid portion 74 is formed in a hollow cylindrical shape (section of the lid portion is annular) including a hollow portion 74S, and on an outer peripheral surface is formed the male screw 74M. In FIG. 2, numerals 76 and 77 express thrust washers.

When the filling hose 61 is mounted to the safety joint 100, the outer cylinder 71 of the hose guide 70 has been attached through the base member 80 to the hydrogen filling apparatus, so that the filling hose 61 pass through the outer cylinder 71, the elastic member accommodating portion 73, the thrust washers 76, 77, the hollow portion of the lid portion 74 of the hose guide 70, and the safety joint 100 side end portion of the filling hose 61 is connected to the depressurizer 30. When the depressurizer 30 is omitted, the end portion of the filling hose 61 is directly connected to the plug 10. Next, the elastic member 72 is arranged between the thrust washers 76, 77, the elastic member 72 is opened from the cut surface, and the elastic member 72 is arranged to surround the filling hose 61.

Next, the male screw 74M of the lid portion 74 is screwed to the female screw 73F of the elastic member accommodating portion 73, and the lid portion 74 is rotated in a direction compressing the elastic member 72. By the compression of the lid portion 74, elastically repulsive force of the elastic member 72 tightens the filling hose 61. And, the elastic member 72 is accommodated and fixed in the elastic member accommodating portion 73. In addition, after the elastic member 72 is accommodated in the elastic member accommodating portion 73, and the elastic member accommodating portion 73, the thrust washers 76, 77 and the lid portion 74 are accommodated in the outer cylinder 71, and the filling hose 61 can be connected to the safety joint 100 side end portion.

In FIGS. 1 and 2 showing a condition that the plug 10 and the socket 20 are connected with each other, the filling hose 61 is connected to the plug 10 side, and extends through the hose guide 70 on the vehicle side. At that time, as described above, the filling hose 61 is held or fixed by the elastic member 72 while being tightened thereby. When the filling hose 61 swings, the swings thereof are perfectly shut at a portion supported by the elastic member 72 of the hose guide 70, and do not transmit on the side of the plug 10 of the safety joint 100. Therefore, swings of the filling hose 61 do not act on the plug 10 of the safety joint 100, and it is prevented that the plug 10 or the depressurizer 30 is broken.

As described above, the inner diameter φ1 of the outer cylinder 71 of the hose guide 70 is set larger than the maximum outer diameter D1 of the cover 50 of the plug 10 of the safety joint 100 (FIG. 1). In addition, the maximum outer diameter of the elastic member accommodating portion 73 of the hose guide 70 is set smaller than the inner diameter size φ1 of the outer cylinder 71. For example, when the vehicle rapidly moves while hydrogen is filled thereto and a tensile force (arrow F) more or equal to a predetermined value is applied to the filling hose 61, as shown in FIG. 3, the socket 20 and the plug 10 of the safety joint 100 are separated from each other.

When the plug 10 is separated from the socket 20, as shown in FIG. 3, the filling hose 61 enters into an area inside the outer cylinder 71 of the hose guide 70 in a radial direction thereof, passes through the outer cylinder 71, and moves toward the vehicle side (lower side in FIG. 3). At that time, members accommodated in the outer cylinder 71 of the hose guide 70 (the elastic member 72, the elastic member accommodating portion 73, the lid portion 74, and the thrust washers 76, 77) do not stay at a position inside the outer cylinder 71 of the hose guide 70, and move toward the vehicle side from the outer cylinder 71 together with the plug 10 and the filling hose 61. The cover 50 surrounding the plug 10 passes through the area radially inside the outer cylinder 71 of the hose guide 70 together with the plug 10.

Therefore, when a tensile force more or equal to a predetermined value acts on the filling hose 61 to separate the plug 10 and the socket 20 from each other, the plug 10 will not be caught in the hose guide 70, and the hydrogen filling apparatus will not be pulled on the vehicle side, which prevents the hydrogen filling apparatus from being fallen or broken. In other words, the hose guide 70 has a function of shutting the swinging of the filling hose 61 and not transmitting a moment generated by the swinging to the plug 10, and a function of allowing the plug 10 (including the cover 50) to pass through an area inside the outer cylinder 71 in a radial direction thereof, and preventing a tensile force from acting on the hydrogen filling apparatus when the socket 20 and the plug 10 are separated from each other.

In the embodiment shown in the figures, the depressurizer 30 can be configured to be accommodated in the hollow portion 74S inside the lid portion 74 of the hose guide 70 in a radial direction thereof. With this construction, when the plug 10 is separated from the socket 20, even if the depressurizer 30 collides to the hollow portion 74S of the lid portion 74, an impact generated by the collision is absorbed by the elastic member 72. When the depressurizer 30 is omitted, it is possible that the lid portion 74 accommodates the plug 10 in the hollow portion 74S. Further, it is possible that the lid portion 74 does not accommodate the depressurizer 30 and the plug 10 in the hollow portion 74S.

Next, the plug 10 and the socket 20 of the safety joint 100 will be explained with reference to FIGS. 4 to 7. The cover 50 explained with reference to FIGS. 1 to 3 is shown by doted lines in FIGS. 5 and 7, but is deleted in FIGS. 4 and 6 to avoid complexities in illustrations. In FIG. 4, the plug 10 shaped like a cylinder as a whole body includes a plug main body 1 and a plug side rod case 3. To a central portion (a vertically central portion at a right end of the plug main body 1 in FIG. 1) on the vehicle side (right side in FIG. 2, a side apart from the socket 20 side) end portion of the plug main body 1 is mounted a hydrogen gas supply port 1B. At a vertically central portion of the plug main body 1 is formed an in-plug passage 1A, and on the in-plug passage 1A is formed a plug side valve element accommodating portion 1C. In the in-plug passage 1A, a passage in the plug side rod case 3 communicates through a passage in the plug side valve element accommodating portion 1C with the hydrogen gas supply port 1B.

In the in-plug passage 1A is accommodated a plug side rod 2, and on an end portion on the side separated from the socket 20 of the plug side rod 2 (right side in FIG. 4) is mounted a plug side valve element 6. On a vehicle side (right side in FIG. 4) of the plug side valve element 6 is arranged a plug side spring 4, which energizes the plug side valve element 6 toward the socket 20 side (left side in FIG. 4). The plug side valve element 6 and a valve seat 1F configure a plug side shutoff valve 5, and the plug side shutoff valve 5 has a function of shutting/opening the plug side passage 1A. An end portion on the opposite side (left side in FIG. 4) of the valve element 6 configures a locking portion 2A.

In FIG. 4, on the outside in a radial direction of the hydrogen gas supply port 1B of the plug main body 1 is formed a flange portion 1D. The flange portion 1D connects the depressurizer 30 (refer to FIGS. 1 and 11 to 13) by a conventional technique. On the other hand, when the plug 10 and the socket 20 are connected with each other, the surface of the flange portion 1D on the side opposite to the surface connected to the depressurizer 30 abuts on a plug accommodating housing 26 of the socket 20. On an outer peripheral surface of the plug main body 1 is formed a connecting channel 1E, and to the connecting channel 1E is fitted a connecting ball 40 for connecting the plug 10 and the socket 20 with each other.

The plug side rod case 3 projects from the plug main body 1 toward the socket 20 side (left side in FIG. 4), and is shaped in a form of a hollow cylinder whose socket 20 side end portion is closed, and in an inner space of the plug side rod case 3 is accommodated the plug side rod 2. In the outer periphery of the plug side rod case 3, at a position corresponding to a lower portion of a socket side rod 22 is formed an opening 3A for passage connection. When the plug 10 and the socket 20 are connected with each other, the plug side rod case 3 is inserted into of an opening portion 21C of the socket 20 (the socket main body 21), and the in-plug passage 1A and an in-socket passage 21A are communicated with each other through the opening 3A.

In FIG. 5, near the socket 20 side end portion of the plug side rod case 3 is formed a locking ball channel 3B, and in the locking ball channel 3B are held locking balls 7. As shown in FIG. 5, by the tapered portion of the locking portion 2A are pressed the locking balls 7 radially outward. But, under the condition shown in FIG. 5, by an inner wall surface of the opening portion 21C of the socket 20, the locking balls 7 do not move radially outward the plug side rod case 3. On the other hand, as shown in FIG. 7, under a condition that the plug 10 and the socket 20 are separated from each other, there is no member that prevents the locking balls 7, which are pressed radially outward the plug side rod case 3, from moving, and the locking balls 7 position radially outward the plug side rod case 3 from the condition shown in FIG. 4.

In FIG. 4, the socket 20 shaped like a cylinder as a whole body has the socket main body 21 and the plug accommodating housing 26. On a horizontally central portion of a hydrogen filling apparatus side (upper side in FIG. 4) end portion of the socket main body 21 is formed a hydrogen gas introducing port 21B. On a horizontally central portion of the socket main body 21 shown in FIG. 4 is formed the in-socket passage 21A extending in the vertical direction, and in a socket side valve element accommodating portion 21D (enlarged portion) formed on the in-socket passage 21A is accommodated a socket side valve element 25. The in-socket passage 21A communicates from the hydrogen gas introducing port 21B through the socket side valve element accommodating portion 21D and a hollow portion of the socket side rod 22, with the opening portion 21C of the socket main body 21. In the opening portion 21C of the socket 20, an end portion apart from the plug 10 of the opening portion 21C (left side in FIG. 4) is opened. Then, on the inner periphery of the opening portion 21C are mounted O-rings SS1, SS2.

To the socket side valve element 25 is connected the socket side rod 22. On the side of the hydrogen gas introducing port 21B (upper side in FIG. 4) of the socket side valve element 25 is arranged a socket side spring 23, and the socket side spring 23 energizes the socket side valve element 25 toward a valve seat 21E (lower side in FIG. 4). The valve element 25 and the valve seat 21E configure a socket side shutoff valve 24, which has a function of shutting/opening the socket side passage 21A. A hydrogen gas fed to the valve element accommodating portion 21D inflows through the openings 22A formed on the socket side rod 22 to the hollow portion of the socket side rod 22. Then, the hollow portion of the socket side rod 22 configures a portion of the in-socket passage 21A.

The plug accommodating housing 26 whose end portions are opened projects from the socket main body 21 toward the plug 10 (right side in FIG. 4). On the inner peripheral surface of the plug accommodating housing 26 are formed at-connection arrangement portions 26A and an at-disconnection accommodating channel 26B. On the at-connection arrangement portions 26A are arranged the connecting balls 40 when the plug 10 and the socket 20 are connected with each other, and in the at-disconnection accommodating channel 26B are accommodated the connecting balls 40 moved from the at-connection arrangement portions 26A when from the socket 20 is disconnected the plug 10. The horizontal (lateral in FIG. 4) position of the at-connection arrangement portions 26A corresponds to that of the plug side connecting channel 1E of the plug main body 1. In addition, on the side of the socket 20 (left side in FIG. 4) of the at-connection arrangement portions 26A is formed a projection α projecting from the at-connection arrangement portions 26A inwardly in a radial direction of the plug 10.

When hydrogen gas is filled, the plug 10 is inserted into the plug accommodating housing 26, and by the connecting balls 40 and the connecting spring 41 are integrally connected the plug 10 and the socket 20 with each other. As shown in FIG. 4, when the plug 10 and the socket 20 are connected with each other, the spring holder 42 to which the connecting spring 41 is attached positions in a gap between the inner peripheral surface of the plug accommodating housing 26 and the outer peripheral surface of the plug main body 1. The connecting balls 40 are fitted into connecting ball holes 42A formed on the spring holder 42, and engage with the plug side connecting channel 1E of the plug main body 1. At this time, on the socket 20 side of the connecting balls 40 (left side in FIG. 4) positions the projection α, and in the radially outward direction of the connecting balls 40 position the at-connection arrangement portions 26A. The spring holder 42 engages with the plug 10 through the connecting balls 40 and the plug side connecting channel 1E. Then, when the plug 10 and the socket 20 are connected with each other, the plug 10 and the socket 20 are integrated with each other so as to hold the spring holder 42 and the connecting balls 40 in between.

In FIG. 4, when a force pulling out the plug 10 (a tensile force acting on the filling hose 61: a force moving the plug 10 rightward in FIG. 4) is applied, through the connecting balls 40, the spring holder 42 and the connecting spring 41 try to move in a direction apart from the socket 20 (right side in FIG. 4). Unless more or equal to predetermined magnitude of force for pulling out the plug 10 is applied thereto, even if to the connecting balls 40 are applied the forces shown as the allows M in FIG. 4, the forces are weakened by the elastically repulsive force by the connecting spring 41, and a condition that connecting balls 40 are fitted into the plug side connecting channel 1E is maintained, which does not release the connection between the plug 10 and the socket 20. On the other hand, when more or equal to predetermined magnitude of force for pulling out the plug 10 is applied thereto, the connecting balls 40 disengaged from the plug side connecting channel 1E and move in the arrow M directions, and as show in FIG. 6, the connecting balls 40 are fitted into the at-disconnection accommodating channel 26B (FIG. 4) of the plug accommodating housing 26. Then, the plug 10 is disconnected from the socket 20, resulting in a disjoint condition shown in FIGS. 6 and 7. Here, the predetermined value (boundary value that the joint between the plug 10 and the socket 20 is released) is determined based on specifications of the hydrogen filling apparatus, the filling hose and the like, and based on the predetermined value are designed the plug 10, the socket 20 and the like.

As shown in FIG. 4, under a condition the plug 10 and the socket 20 are connected with each other, the lower end portion of the hollow socket side rod 22 abuts on the plug side rod case 3, so that the socket side rod 22 positions, against the elastically repulsive force of the socket side spring 23, on an upper portion in FIG. 4, and the socket side shutoff valve 24 opens. In addition, as shown in FIG. 5, the plug side rod 2 that cannot move leftward from the locking balls 7 separates, against the elastically repulsive force of the plug side spring 4, the plug side valve element 6 from the plug side valve seat 1F. As a result, the plug side shutoff valve 5 opens. When both of the socket side shutoff valve 24 in the socket 20 and the plug side shutoff valve 5 in the plug 10 become open, the in-socket passage 21A (the hydrogen gas introducing port 21B, the socket side valve element accommodating portion 21D, the hollow portion of the socket side rod 22 and the opening portion 21C of the socket 20) and the in-plug passage 1A (the hollow portion of the plug side rod case 3, the plug side valve element accommodating portion 1C) are communicated with each other, and from the side of the hydrogen filling apparatus (weighing machine) to the side of the vehicle flows hydrogen gas.

When a tensile force more or equal to a predetermined magnitude is applied to the filling hose so as to detach the connecting balls 40 (connecting members) from the plug side connecting channel 1E, the plug 10 and the socket 20 are disconnected from each other. When the plug 10 and the socket 20 are disconnected from each other, as shown in FIG. 6, the plug side rod case 3 of the plug 10 is detached from the opening portion 21C of the socket 20 (socket main body 21), and the socket side valve element 25 moves downward in FIG. 6 by an elastically repulsive force of the socket side spring 23. As a result, the socket side valve element 25 seats on the socket side valve seat 21E, and the socket side shutoff valve 24 shuts the in-socket passage 21A. In addition, as shown in FIG. 7, when the locking balls 7 moves outwardly radially from the plug side rod case 3 in the locking ball channel 3B, the plug side rod 2 moves leftward from the locking balls 7 by the elastically repulsive force of the plug side spring 4. As a result, the plug side valve element 6 seats on the plug side valve seat 1F, and the plug side shutoff valve 5 shuts the in-plug passage 1A. Since the socket side shutoff valve 24 and the plug side shutoff valve 5 close the in-socket passage 21A and the in-plug passage 1A respectively, hydrogen gas does not leak from vehicle side and weighing machine side.

As explained with reference to FIGS. 1 and 2, the cover 50 (expressed with dashed lines in FIGS. 5 and 7) is mounted to protect the plug side rod 2. As shown in FIG. 5, when the plug 10 and the socket 20 are connected with each other, the cover 50 surrounds the plug 10 and the plug side rod 2. On the other hand, as shown in FIG. 7, when the plug 10 and the socket 20 are disconnected from each other, the cover 50 attached to the plug 10 side separates from the socket 20 also. The cover 50 has a size capable of perfectly covering the plug side rod 2 in an axial direction thereof. Therefore, even if the plug 10 and the socket 20 are separated from each other, and the plug 10 falls and collides with the hydrogen filling apparatus or the vehicle, to the plug side rod 2 protected by the cover 50 is not directly added an impact, and breakage of the plug side rod 2 is prevented.

In the socket main body 21 of the safety joint 100 shown in FIGS. 4 to 7, the end portion opposite to the plug 10 side (left side in FIG. 4) of the opening portion 21C in which the plug side rod case 3 is inserted opens. But, in the opening portion 21C, the end portion opposite to the plug 10 side (left side in FIG. 4) can be closed to be a blind hole. In this case, the O-ring SS2 (FIG. 4) is not required.

Next, with reference to FIGS. 8 to 10 will be explained a hose guide in a mode different from the hose guide shown in FIGS. 1 to 3. A hose guide 70 shown in FIGS. 1 to 3 shuts swinging of the filling hose 61 to prevent moment by the swinging from acting on the plug 10 of the safety joint 100. And, even if the socket 20 and the plug 10 are disconnected from each other, the plug 10 can pass through inside of the outer cylinder 71 of the hose guide 70, so that it is prevented that the hydrogen filling apparatus falls. A hose guide indicated by the numeral 70A in FIGS. 8 to 10 also has a function of preventing that a portion of the hose on the safety joint 100 side from the hose guide 70A rotates when a twist occurs in the filling hose 61 (FIGS. 1 to 3).

The hose guide 70A has, as same as the hose guide 70 shown in FIGS. 1 to 3, an outer cylinder 71A, an elastic member 72A surrounding the filling hose 61, an elastic member accommodating portion 73A accommodating the elastic member 72A in a hollow portion, and a lid portion 74A for closing the hollow portion of the elastic member accommodating portion 73A, and further includes an outer cylinder fixing portion 75 and a nut 78 for tightening the outer cylinder fixing portion 75 downward (FIG. 9). In FIG. 9, the outer cylinder 71A with a hollow cylindrical shape accommodates the elastic member 72A, the elastic member accommodating portion 73A, and the lid portion 74A. On a lower end of the outer cylinder 71A is mounted a flange 71AA projecting radially outward over an entire circumference. In addition, in the outer peripheral surface of the outer cylinder 71A, from an upper end portion to near of a lower end portion is formed a male screw 71AF screwed to a female screw of the nut 78. Here, the inner diameter size φ1A of the outer cylinder 71A is set lager than the maximum diameter D1 (FIGS. 1 to 3) of the cover 50 for covering the plug 10.

As same as the explanation with reference to FIGS. 1 to 3, the elastic member accommodating portion 73A has a hollow portion for accommodating the elastic member 72A, a supporting portion 73AH for supporting the elastic member 72A in a vertical direction (FIG. 9), and a female screw 73AF on an inner peripheral surface. However, on the lower end portion (FIG. 9) of the elastic member accommodating portion 73A is formed a projection 73AT projecting radially outward. The projection 73AT can be formed at one spot in a radial direction, but plurality of projections 73AT can be formed at plural spots.

The outer cylinder fixing portion 75 is arranged on an outer periphery of the lower end portion of the outer cylinder 71A, on an inner peripheral surface of the outer cylinder fixing portion 75 is formed a channel 75A, and into the channel 75A can be accommodated the flange 71AA of the outer cylinder 71A. In order to insert the flange 71AA into the channel 75A and facilitate the attachment, although not clearly shown in figures, it is preferable that the outer cylinder fixing portion 75 is divided into two parts in a radial direction, or configured like a nest. On the inner peripheral surface of the outer cylinder fixing portion 75 is formed a channel 75B capable of accommodating the projection 73AT of the elastic member accommodating portion 73A, and the channel 75B extends in a longitudinal direction of a filling hose not shown, that is, in a vertical direction in FIG. 9 and opens at an end portion of the outer cylinder fixing portion 75. Although not clearly shown in figures, the outer cylinder fixing portion 75 is fixed to the hydrogen filling apparatus side by a known method, and the outer cylinder fixing portion 75 is attached to the base member 80 shown in FIGS. 1 and 2, for example.

The elastic member 72A and the lid portion 74A are the same as the elastic member 72 and the lid portion 74 shown in FIGS. 1 to 3 respectively. The numeral 72AB shown in FIG. 10 indicates a cut surface formed in a radial direction of the elastic member 72A, opening from the cut surface 72AB causes the elastic member 72A to be arranged to surround the filling hose 61 or to wind around the filling hose 61. Although not clearly shown in FIGS. 1 to 3, on the elastic member 72 shown in FIGS. 1 to 3 is mounted the same cut surface as the cut surface 72AB. In FIG. 9, the numerals 76 and 77 indicate thrust washers.

When the filling hose 61 is mounted on the safety joint 100, the flange 71AA of the outer cylinder 71A is inserted into the channel 75A of the outer cylinder fixing portion 75; the nut 78 is screwed to the male screw 71AF of the outer peripheral surface of the outer cylinder 71A; the outer cylinder fixing portion 75 is sandwiched between the nut 78 and the flange 71AA of the outer cylinder 71A; and the outer cylinder 71A is fixed to the outer cylinder fixing portion 75. The outer cylinder fixing portion 75 to which the outer cylinder 71A is fixed is fixed through the base member 80 (FIGS. 1 and 2) to the hydrogen filling apparatus (not shown) side for example. Next, the filling hose 61 is passed through the elastic member accommodating portion 73A, the thrust washers 76, 77, the lid portion 74A, the outer cylinder 71A, the outer cylinder fixing portion 75, the hollow portion of the nut 78, and the safety joint 100 side end portion of the filling hose 61 is connected to the depressurizer 30. However, when the depressurizer 30 is omitted, the safety joint 100 side end portion of the filling hose 61 is connected to the plug 10.

Then, the elastic member 72A is opened from the cut surface 72AB to surround the filling hose 61. And, the lid portion 74A, the thrust washer 76, the elastic member 72A, the thrust washer 77, the elastic member accommodating portion 73A are accommodated in the hollow portion of the outer cylinder 71A. When the elastic member accommodating portion 73A is accommodated, a position of the projection 73AT in a radial direction is matched with a position of the channel 75B of the outer cylinder fixing portion 75 in a radial direction, and the elastic member accommodating portion 73A is inserted from an opened portion on a lower portion in FIG. 9 into the channel 75B. Then, the male screw 74AM of the lid portion 74A is screwed to the female screw 73AF of the elastic member accommodating portion 73A, the lid portion 74A rotates to compress the elastic member 72A in a vertical direction of FIG. 9, and the elastic member 72A is fixed in the elastic member accommodating portion 73A.

In the hose guide 70A configured as shown in FIGS. 8 to 10, the projection 73AT of the elastic member accommodating portion 73A and the channel 75B of the outer cylinder fixing portion 75 action as a key and a key groove respectively, so that the elastic member accommodating portion 73A can move in a vertical direction of FIGS. 8 and 9 but cannot rotate relative to the outer cylinder fixing portion 75. Here, in the same manner as explained with reference to FIGS. 1 to 3, to the filling hose 61 is added tightening force from the elastic member 72A. Therefore, even if a twist occurs in the filling hose 61, rotation of the filling hose 61 is suppressed by a portion where the filling hose 61 held by the elastic member 72A. Then, the twist of the filling hose 61 is shut at the portion held by the elastic member 72A, and is not transmitted to the plug 10 side of the safety joint 100, so that it is prevented that the rotation of the filling hose 61 breaks the depressurizer 30 or the plug 10. Other construction and action effect of the hose guide 70A shown in FIGS. 8 to 10 are the same as those of the hose guide 70 shown in FIGS. 1 to 3.

Next, the depressurizer 30 will be explained with reference to FIGS. 11 to 13. The depressurizer 30 is attached to the plug 10 of the safety joint 100, and has a function of depressurizing high pressure hydrogen gas in an area on the vehicle side from the plug 10 of the filling hose 61 when the plug 10 and the socket 20 are separated from each other. In addition, hydrogen gas in an area on the hydrogen filling apparatus side from the socket 20 is depressurized by a depressurizing mechanism not shown on the hydrogen filling apparatus side.

In FIG. 11, the depressurizer 30 has a metal depressurizer main body portion 31 with a nearly rectangular parallelepiped shape and a metal depressurizing plug 32, and the depressurizing plug 32 is configured to engage with (be screwed to) a depressurizing communication hole 31B of the main body portion 31. On a right side of the main body portion 31 is formed a concaved portion 31F, and to the concaved portion 31F is connected the vehicle side filling hose 61. Although not clearly shown, an end portion 31E on a left side of the main body portion 31 is connected to the plug 10 of the safety joint 100. On a central portion in a vertical direction of the main body portion 31 is formed a hydrogen gas passage 31A, and the hydrogen gas passage 31A communicates through the end portion 31E with the in-plug passage 1A on the plug 10 side and communicates through the concaved portion 31F with the filling hose 61.

In FIG. 11, the depressurizing communication hole 31B communicating from an upper surface 31G with the hydrogen gas passage 31A extends in a vertical direction, and with the depressurizing communication hole 31B communicates a relief circuit 31C (FIGS. 12 and 13). A cross sectional area of the relief circuit 31C is set small to be enough to add a sufficient pressure loss to a flowing hydrogen gas. Into the depressurizing communication hole 31B is fitted the depressurizing plug 32, and as shown in FIG. 12, engagement of the depressurizing plug 32 and the depressurizing communication hole 31B shuts the relief circuit 31C from the hydrogen gas passage 31A.

The depressurizing communication hole 31B has a small diameter portion 31BA communicating with the hydrogen gas passage 31A, a tapered portion 31BB, the first middle diameter portion 31BC, the second middle diameter portion 31BD, and a female screw portion 31BE communicating with the upper surface 31G. On the other hand, the depressurizing plug 32 has a pin end portion 32A with a minimum diameter in a lower end portion, a pin tapered portion 32B, a pin middle diameter portion 32C, a male screw portion 32D forming a male screw on an outer periphery. When the depressurizing plug 32 is fitted into the depressurizing communication hole 31B, the pin end portion 32A of the depressurizing plug 32 is inserted into the small diameter portion 31BA of the depressurizing communication hole 31B.

As shown in FIG. 11, the pin tapered portion 32B of the depressurizing plug 32 and the tapered portion 31BB of the depressurizing communication hole 31B are complementary shapes with each other, and the pin tapered portion 32B contacts the tapered portion 31BB. Here, the depressurizing plug 32 and the main body portion 31 are made of metal, so that a portion where the pin tapered portion 32B and the tapered portion 31BB contact with each other configures a so-called "metal seal". Between the pin middle diameter portion 32C of the depressurizing plug 32 and the second middle diameter portion 31BD of the pressurizing communication hole 31B is arranged an O-ring 31H, and the O-ring 31H prevents high pressure hydrogen gas from injecting upward in FIGS. 11 and 13 from a gap between the depressurizing plug 32 and the depressurizing communication hole 31B when the depressurizing plug 32 sufficiently rises against the depressurizing communication hole 31B (in a condition that engagement between the depressurizing plug 32 and the main body portion 31 is released: refer to FIG. 13). On the depressurizing communication hole 31B is formed the female screw portion 31BE, and to the female screw portion 31BE is screwed a male screw formed on the outer periphery of the male screw portion 32D. In addition, on an upper surface of the depressurizing plug 32 is formed a hexagon socket 32E (plug hexagon socket), and a hexagonal rod spanner not shown is inserted into the plug hexagon socket 32E to be rotated when the depressurizing plug 32 is attached to/detached from the depressurizing communication hole 31B.

As shown in FIGS. 12 and 13, in an area near a boundary between the tapered portion 31BB and the first middle diameter portion 31BC, the depressurizing communication hole 31B communicates with the relief circuit 31C. As shown in FIGS. 11 and 12, in a condition that the depressurizing plug 32 is tightened to the depressurizing communication hole 31B, the pin tapered portion 32B and the tapered portion 31BB of the depressurizing communication hole 31B contact with each other to configure the metal seal, so that high pressure hydrogen gas flowing in the hydrogen gas passage 31A is completely shut by the metal seal and does not flow into the relief circuit 31C. On the other hand, when the plug 10 and the socket 20 are separated from each other, the depressurizing plug 32 is rotated in a depressurizing direction by the hexagonal rod spanner for example, the engagement between the female screw portion 31BE of the depressurizing communication hole 31B and the male screw portion 32D of the depressurizing plug 32 is released, the pin tapered portion 32B and the tapered portion 31BB of the depressurizing communication hole 31B are separated from each other, and the metal seal is released.

A condition that the metal seal is released is shown in FIG. 13. A diameter size d1 of the pin end portion 32A is set smaller than the inner diameter d2 of the small diameter portion 31BA of the depressurizing communication hole 31B (d1<d2), between an outer periphery of the pin end portion 32A and an inner periphery of the small diameter portion 31BA of the depressurizing communication hole 31B is formed an annular gap whose cross sectional area is $(\pi/4)(d2^2-d1^2)$. When the depressurization shown in FIG. 13 is performed, high pressure hydrogen gas filled in the hydrogen gas passage 31A inflows through the annular gap (working as an orifice) into the relief circuit 31C and passes through the relief circuit 31C to outflow from the depressurizer 30 as shown by the arrow O. At that time, the pressure of the hydrogen gas decreases when the hydrogen gas passes through the annular gap and the relief circuit 31C, so that it is prevented that the hydrogen gas suddenly injects from the relief circuit 31C. Then, it is prevented the filling hose 61 moves around. Here, a hydrogen gas outlet of the relief circuit 31C is mounted at a position apart from the plug hexagon socket 32E (above the depressurizing plug 32). Then, even if sparks generate by contacts between the hexagonal rod spanner and the plug hexagon socket 32E when the hexagonal rod spanner is inserted into the plug hexagon socket 32E to be rotated, a possibility that the hydrogen gas catches fire due to the sparks becomes extremely low, and safety thereof improves.

In FIGS. 11 to 13, as shown in FIG. 12 for example, in a condition the depressurizing plug 32 is tightened to the depressurizing communication hole 31B, a length L of the pin end portion 32A (vertical length in FIG. 12) and a length HL of the small diameter portion 31BA of the depressurizing communication hole 31B are relatively long, and a length LW of the pin end portion 32A inserted into the small diameter portion 31BA of the depressurizing communication hole 31B is relatively long also. Therefore, even if the hexagonal rod spanner is excessively rotated in the plug hexagon socket 32E, the pin end portion 32A will not be completely separated from the small diameter portion 31BA of the depressurizing communication hole 31B, a condition that the hydrogen gas passes through the annular gap between the small diameter portion 31BA and the pin end portion 32A (cross sectional area is $(\pi/4)(d2^2-d1^2)$) is maintained, and pressure of the hydrogen gas can be decreased due to the pressure loss.

Although not shown in figures, in the depressurizer 30, the length L of a hydrogen passage side end portion (pin end portion 32A) of the depressurizing plug 32 can be set shorter, on the upper surface 31G of the main body portion 31 can be mounted a lock pin inserted hole, into the lock pin inserted hole can be inserted the a lock pin for suppressing the rotation of the hexagonal rod spanner.

Since the embodiments shown in the drawings are merely examples, and the embodiments do not limit the technical scope of the present invention.

DESCRIPTION OF THE REFERENCE NUMERALS 1 plug main body
1A in-plug passage
2 plug side rod
10 plug
20 socket
21A in-socket passage
30 depressurizer
31 main body portion
31A hydrogen gas passage
31B depressurizing communication hole
31BA small diameter portion
31BB tapered portion
31C relief circuit
32 depressurizing plug
32A pin end portion
32B pin tapered portion
50 cover
61 filling hose
70, 70A hose guides
71, 71A outer cylinders
72, 72A elastic members
73, 73A elastic member accommodating portions
73AT projection
74, 74A lid portions
75 outer cylinder fixing portion
75A channel
100 safety joint

What is claimed is:

1. A safety joint comprising a plug with a cylindrical shape in which a passage is formed, a socket in which a passage continuing to the passage in the plug is formed, and a shut off valve mounted on the passage in the socket, the shut off valve opening when the plug being inserted into the socket and closing when the plug being disconnected therefrom, wherein central axes of the passages of the plug and the socket do not form a straight line, a filling hose is connected to the plug, and a hose guide configured to allow the filling hose to extend therethrough for limiting movement of the filling hose at a position separated from the plug, the hose guide including an outer cylinder, an elastic member for surrounding the filling hose, an elastic member accommodating portion accommodating the elastic member in a hollow portion, and a lid portion engaging with the elastic member accommodating portion to close the hollow portion, and an inner diameter size of the outer cylinder is larger than a maximum diameter of the plug.

2. The safety joint as claimed in claim 1, wherein the outer cylinder is fixed by an outer cylinder fixing portion, a projection projecting outward in a radial direction of the hose guide is formed on an end portion of the elastic member accommodating portion of the hose guide, and a channel capable of accommodating the projection is formed on an inner peripheral surface of the outer cylinder fixing portion.

3. The safety joint as claimed in claim 1, further comprising a cover for protecting a valve rod mounted on one of the plug and the socket.

4. The safety joint as claimed in claim 1, wherein the plug comprises a depressurizer including a main body portion made of metal, a depressurizing communication hole communicating with a hydrogen gas passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

5. The safety joint as claimed in claim 2, further comprising a cover for protecting a valve rod mounted on one of the plug and the socket.

6. The safety joint as claimed in claim 2, wherein the plug comprises a depressurizer including a main body portion made of metal, a depressurizing communication hole communicating with a hydrogen gas passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

7. The safety joint as claimed in claim 3, wherein the plug comprises a depressurizer including a main body portion made of metal, a depressurizing communication hole communicating with a hydrogen gas passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

8. A safety joint comprising a plug with a cylindrical shape in which a passage is formed, a socket in which a passage continuing to the passage in the plug is formed, and a shut off valve mounted on the passage in the socket, the shut off valve opening when the plug being inserted into the socket and closing when the plug being disconnected therefrom, wherein central axes of the passages of the plug and the socket do not form a straight line, a filling hose is connected to the plug, and a hose guide for limiting movement of the filling hose at a position separated from the plug, the hose guide including an outer cylinder, an elastic member for surrounding the filling hose, an elastic member accommodating portion accommodating the elastic member in a hollow portion, and a lid portion engaging with the elastic member accommodating portion to close the hollow portion, and an inner diameter size of the outer cylinder is larger than a maximum diameter of the plug.

9. The safety joint as claimed in claim 8, further comprising a cover for protecting a valve rod mounted on one of the plug and the socket.

10. The safety joint as claimed in claim 8, wherein the plug comprises a depressurizer including a main body portion made of metal, a depressurizing communication hole communicating with a hydrogen gas passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

\* \* \* \* \*